(12) United States Patent
Chu

(10) Patent No.: US 8,592,672 B2
(45) Date of Patent: Nov. 26, 2013

(54) FOLDABLE SOLAR ENERGY COLLECTOR

(75) Inventor: Raymond Chu, Jubi (TW)

(73) Assignee: Leadinway Co., Ltd., Jubi, Hsinchu Hsien (TW)

( * ) Notice: Subject to any disclaimer, the term of this patent is extended or adjusted under 35 U.S.C. 154(b) by 105 days.

(21) Appl. No.: 13/401,893

(22) Filed: Feb. 22, 2012

(65) Prior Publication Data

US 2012/0216850 A1 Aug. 30, 2012

(30) Foreign Application Priority Data

Feb. 25, 2011 (TW) .............................. 100203361 U

(51) Int. Cl.
*H01L 31/045* (2006.01)

(52) U.S. Cl.
USPC ........... 136/245; 135/129; 135/139; 126/682; 250/200

(58) Field of Classification Search
USPC ........................................... 135/26, 129, 139
See application file for complete search history.

(56) References Cited

U.S. PATENT DOCUMENTS

| | | | | |
|---|---|---|---|---|
| 4,105,039 A | * | 8/1978 | Schultes et al. | 135/25.33 |
| 5,370,144 A | * | 12/1994 | Yang | 135/25.31 |
| 5,564,453 A | * | 10/1996 | Steiner | 135/98 |
| 7,665,477 B1 | * | 2/2010 | Hathaway | 135/20.3 |
| 2003/0070700 A1 | * | 4/2003 | Tung | 135/26 |
| 2007/0283987 A1 | * | 12/2007 | Reyes et al. | 135/16 |
| 2008/0092936 A1 | * | 4/2008 | Carabillo | 135/16 |
| 2009/0293933 A1 | * | 12/2009 | Clark | 136/245 |

* cited by examiner

*Primary Examiner* — Jennifer Michener
*Assistant Examiner* — Matthew Zapadka
(74) *Attorney, Agent, or Firm* — The Weintraub Group, P.L.C.

(57) ABSTRACT

A foldable solar energy collector has a base and a panel body. The base has an elevatable telescopic shaft mounted thereon. The panel body has a bottom board and multiple side panels pivotally mounted around a perimeter of the bottom board. Two foldable panels are respectively and pivotally mounted on two edges of each side panel. A link assembly is pivotally mounted between the panel body and the telescopic shaft and has multiple inside and outside links pivotally connected to each other. One end of each inside link away from a corresponding outside link is pivotally mounted on the telescopic shaft. One end of each outside link away from a corresponding inside link is pivotally mounted between adjacent two of the foldable panels. When the telescopic shaft is elevated, the link assembly is pulled to drive the panel body to unfold or fold, rendering convenience in operation and storage.

20 Claims, 7 Drawing Sheets

FOLDABLE SOLAR ENERGY COLLECTOR

BACKGROUND OF THE INVENTION

1. Field of the Invention

The present invention relates to a solar energy collector and more particularly to a foldable solar energy collector that is convenient for operation and storage.

2. Description of the Related Art

Solar energy collectors can be also called solar chips, solar cells or photovoltaic cells, and are thin-sheet optoelectronic semiconductors transforming solar energy to generate electricity. When exposed to sunlight, the solar energy collectors instantly output voltage and current but create no greenhouse gas, such as carbon dioxide, attributable to global warming and environmental pollution. In contrast to the conventional way using petroleum, which is a non-recycling and increasingly expensive fuel, to generate power, solar energy, as involving no recycling issue and being inexpensive to acquire, could be a prevailing energy after the power generation technology of solar energy becomes more mature and well-developed.

The main structure of each solar energy collector takes the form of a panel, and has an incidence surface made of monocrystalline silicon, polycrystalline silicon and the like. After receiving sunlight, the incidence surface transforms solar energy into electric energy. To ensure an optimal operation of the solar energy collectors, the solar energy collectors are preferably mounted on an outdoor location, such as a roof, a square or other places with altitude, with their incidence surfaces facing the sun.

The efficiency of each solar energy collector for transforming solar energy into electric energy is proportional to the area of the incidence surface. For the sake of generation of more electric energy, the solar energy collectors tend to have a large area. However, the solar energy collectors having large area cause inconvenience in shipment or installation. Besides, the incidence surfaces exposed to rainy or stormy weather are prone to damage arising from the weather, further lowering the life duration and efficacy of the solar energy collectors.

SUMMARY OF THE INVENTION

An objective of the present invention is to provide a foldable solar energy collector being convenient for operation and storage.

To achieve the foregoing objective, the foldable solar energy collector has a base, a panel body and a link assembly.

The base has a telescopic shaft being elevatable.

The panel body has a bottom board, multiple side panels, multiple foldable panels and multiple guide rods. The bottom board has a perimeter, a center hole and multiple elongated channels. The center hole is centrally formed through the bottom board. The elongated channels are radially formed through the bottom board and extend to the perimeter of the bottom board. The side panels are pivotally mounted around the perimeter of the bottom board. Each side panel is mounted between adjacent two of the elongated channels. One edge of each foldable panel is pivotally mounted on one edge of one of the side panels, and another edge of the foldable panel is aligned with a direction of one of the elongated channels and is pivotally mounted on one edge of adjacent one of the foldable panels. Each guide rod is pivotally mounted between adjacent two of the foldable panels, and one end of the guide rod is pivotally mounted on the bottom board and located within one of the elongated channels so that the telescopic shaft penetrates through the center hole of the bottom board.

The link assembly has multiple link sets and a coupling block.

Each link set corresponds to one of the elongated channels of the bottom board and has an inside link and an outside link. The inside link has one end pivotally mounted around the telescopic shaft. The outside link is pivotally mounted on the inside link and has a pivoting portion. The pivoting portion has a first end, a second end and a third end. The first end is adjacent to the inside link and pivotally connected to the end of a corresponding guide rod pivotally mounted on the bottom board. The second end is farthest away from the inside link. The third end is located between the first end and the second end.

The coupling block is pivotally connected to the second end of a corresponding outside link and slidably mounted around a corresponding guide rod.

The foldable solar energy collector is advantageous in that the telescopic shaft is elevated to pull the link assembly for the link assembly to drive the panel body to unfold or fold. When the panel body is unfolded, each of the side panels, the foldable panels, and the top panels is capable of receiving sunlight with all the areas of the incidence surfaces thereof. During rainy or stormy weather, the panel body is folded so that the incidence surface of each of the side panels, the foldable panels, and the top panels face inwardly and is shielded and protected against damage. Accordingly, the solar energy collector is durable and efficient in operation, and facilitates shipment, installation and storage when folded.

Other objectives, advantages and novel features of the invention will become more apparent from the following detailed description when taken in conjunction with the accompanying drawings.

DETAILED DESCRIPTION OF THE INVENTION

Figure 1:
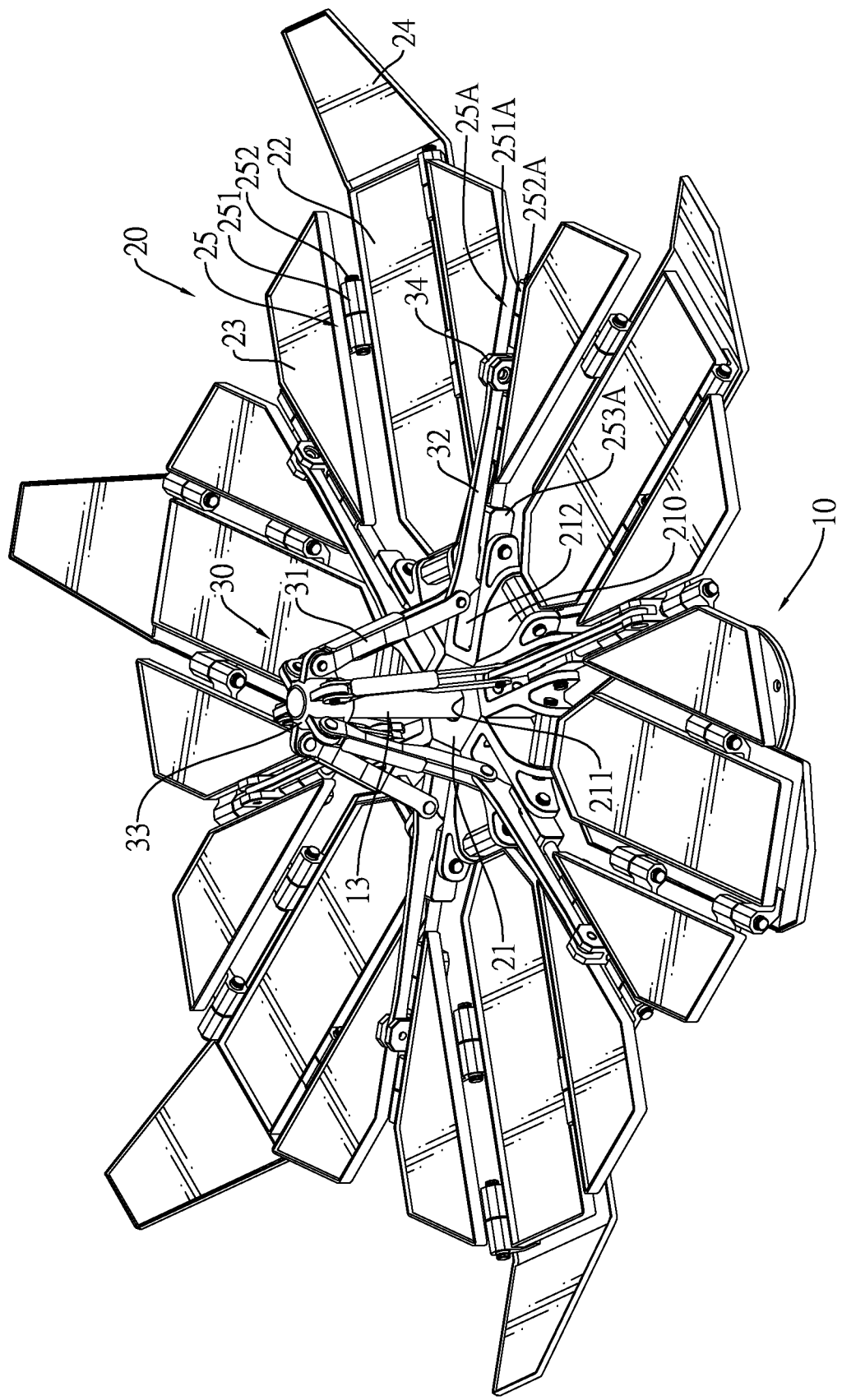
FIG. 1 is a perspective view of a foldable solar energy collector in accordance with the present invention when the solar energy collector is unfolded.
Figure 2:
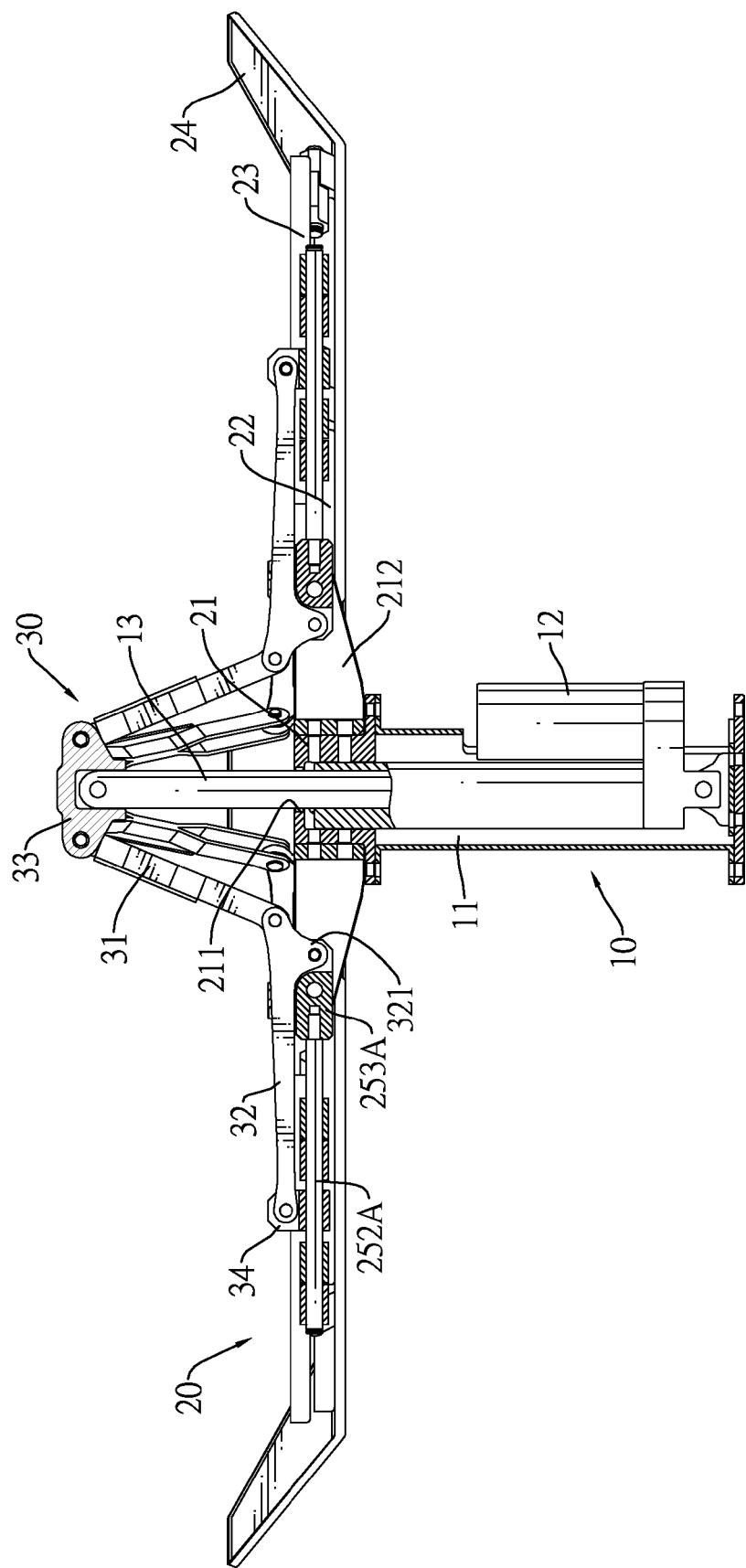
FIG. 2 is a side view in partial section of the foldable solar energy collector in FIG. 1.

With reference to FIGS. 1 and 2, a foldable solar energy collector in accordance with the present invention has a base 10, a panel body 20 and a link assembly 30.

The base 10 has a support stand 11. The support stand 11 is hollow and has a linear actuator 12 mounted therein. The linear actuator 12 has a telescopic shaft 13 being elevatable and protruding beyond a top of the support stand 11.

The panel body 20 has a bottom board 21, multiple side panels 22, multiple foldable panels 23 and multiple top panels 24. The bottom board 21 is securely mounted on the top of the support stand 11 of the base 10, and has a center hole 211 and multiple elongated channels 212. The center hole 211 is centrally formed through the bottom board 21. The telescopic shaft 13 is mounted through the center hole 211. The elongated channels 212 are radially formed through the bottom board 21 and extend to a perimeter of the bottom board 21. The side panels 22 are pivotally mounted around the perimeter of the bottom board 21. Each side panel 22 is pivotally mounted between adjacent two of the elongated channels 212. One edge of each foldable panel 23 is pivotally mounted on one edge of one of the side panels 22, and another edge of the foldable panel 23 is aligned with a direction of one of the elongated channels 212 and pivotally mounted on a symmetric side of adjacent one of the foldable panels 23. Each top panel 24 is obliquely formed on and protrudes upwardly from one edge of one of the side panels 22 away from the bottom board 21. A top surface of each of the side panels 22, the foldable panels 23, and the top panels 24 is an incidence surface.

Figure 3:
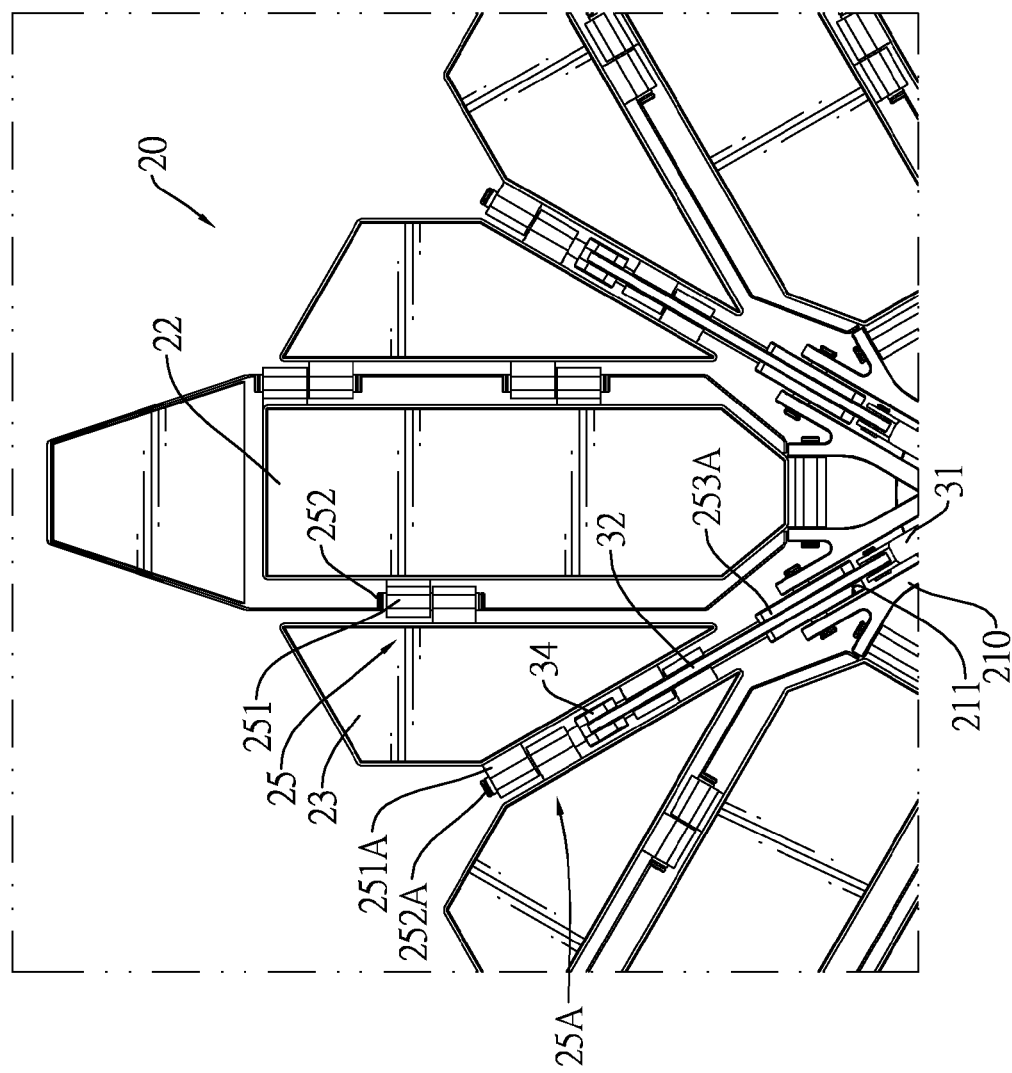
FIG. 3 is a partially enlarged top view of the foldable solar energy collector in FIG. 1.
Figure 4:
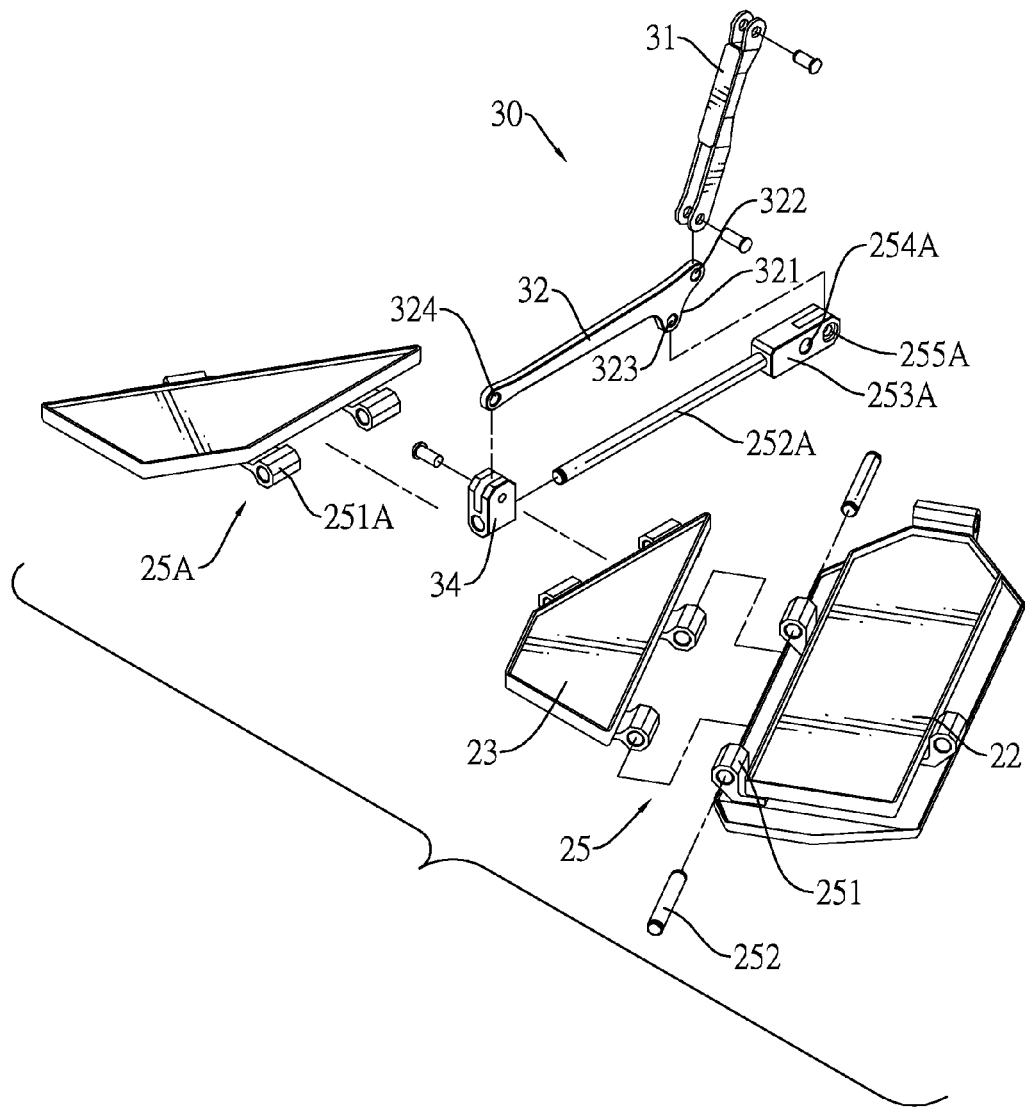
FIG. 4 is a partially exploded perspective view of the foldable solar energy collector in FIG. 1.

With reference to FIGS. 3 and 4, each foldable panel 23 and a corresponding side panel 22 are pivotally mounted together with at least one first hinge 25. Each one of the at least one first hinge 25 has two first hinge wings 251 and a pin 252. One first hinge wing 251 is securely mounted on one edge of the foldable panel 23, the other first hinge wing 251 is securely mounted on a corresponding edge of the side panel 22, and the pin 252 is mounted through the two first hinge wings 251. Each adjacent two of the foldable panels 23 are pivotally mounted together with at least one second hinge 25A. Each one of the at least one second hinge 25A has two second hinge wings 251A and a guide rod 252A. One second hinge wing 251A is securely mounted on one edge of adjacent one of the foldable panels 23, the other second hinge wing 251A is securely mounted on a symmetric edge of another adjacent one of the foldable panels 23, and the guide rod 252A is mounted through the two second hinge wings 251 and has a pivoting block 253A. The pivoting block 253A is formed on one end of the guide rod 252A and has an outer bore 254A and an inner bore 255A formed through the pivoting block 253A. The outer bore 254A is pivotally connected to the bottom board 21 and located within one of the elongated channels 212.

With further reference to FIGS. 1 and 4, the link assembly 30 has multiple link sets, a cap 33 and a coupling block 34. Each link set corresponds to one of the elongated channels 212 of the bottom board 21 and has an inside link 31 and an outside link 32. The outside link 32 is pivotally connected to the inside link 31. The outside link 32 has a pivoting portion 321. The pivoting portion 321 has a first end, a second end, a third end, a first pivot hole 322, a second pivot hole 323, and a third pivot hole 324. The first end is adjacent to the inside link 31. The second end is farthest away from the inside link 31. The third end is located between the first end and the second end. The first pivot hole 322 is formed through the first end of the pivoting portion 321 and is pivotally connected to one end of the inside link 31. The second pivot hole 324 is formed through the second end of the pivoting portion 321. The third pivot hole 323 is formed through the third end of the pivoting portion 321 and is pivotally connected to the inner bore 255A of the pivoting block 253A. One end of the inside link 31 of each link set away from the outside link 32 is mounted on a periphery of the cap 33 and the cap 33 is mounted around a top end of the telescopic shaft 13. The coupling block 34 is pivotally connected to the second pivot hole 324 and is slidably mounted around a corresponding guide rod 252A.

With further reference to FIG. 1, the bottom board 21 is hexagonal and further has six link holders 210. Each link holder 210 is mounted on one edge of the bottom board 21 and has one of the elongated channels 212 formed through the link holder 210 and having an open end away from the center hole 211. Each rectangular side panel 22 is pivotally mounted between two corresponding link holders 210. Each two adjacent trapezoidal and symmetric foldable panels 23 are pivotally mounted between two corresponding side panels 22. The top panels 24 are also trapezoidal. The link assembly 30 has six link sets. Each link set has an inside link 31 and an outside link 32 pivotally connected to the inside link 31.

Figure 5:
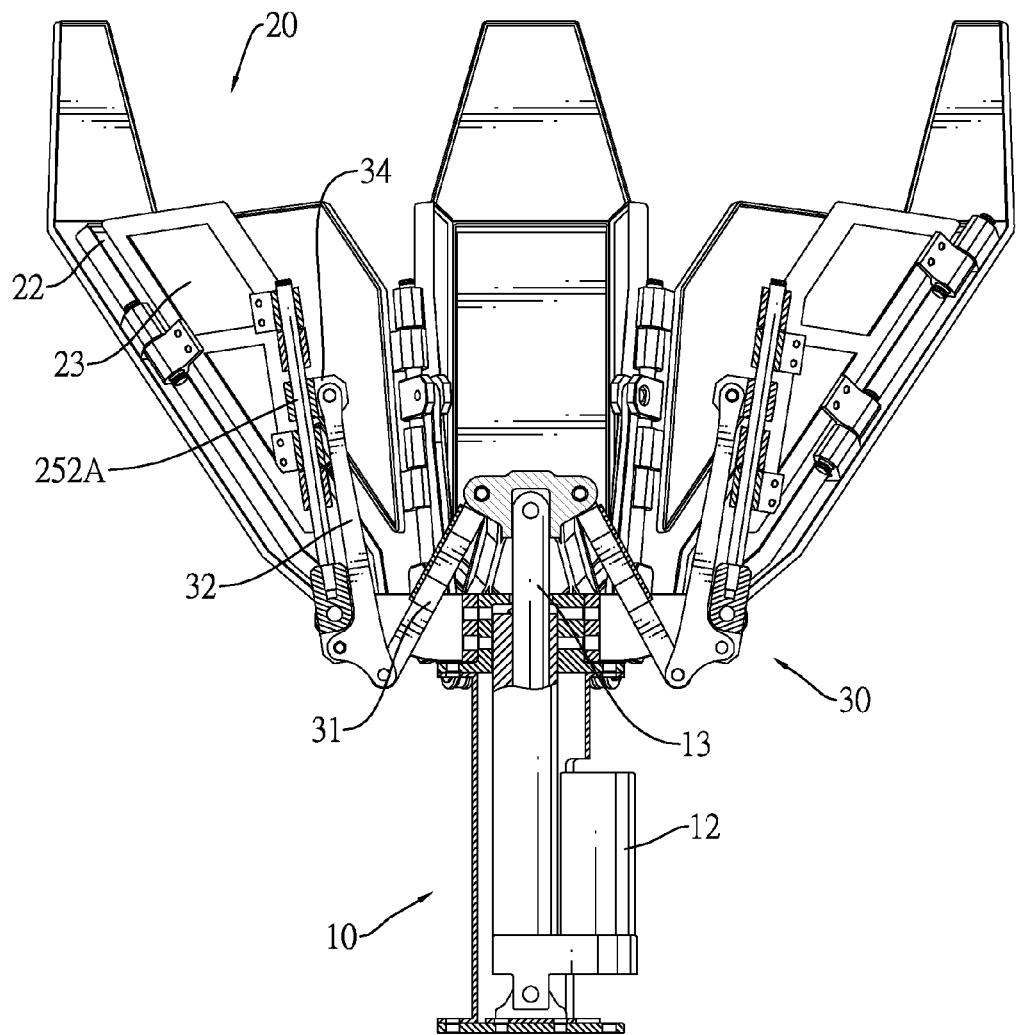
FIG. 5 is a side view in partial section of the solar energy collector in FIG. 1 when the solar energy collector is half-folded.
Figure 6:
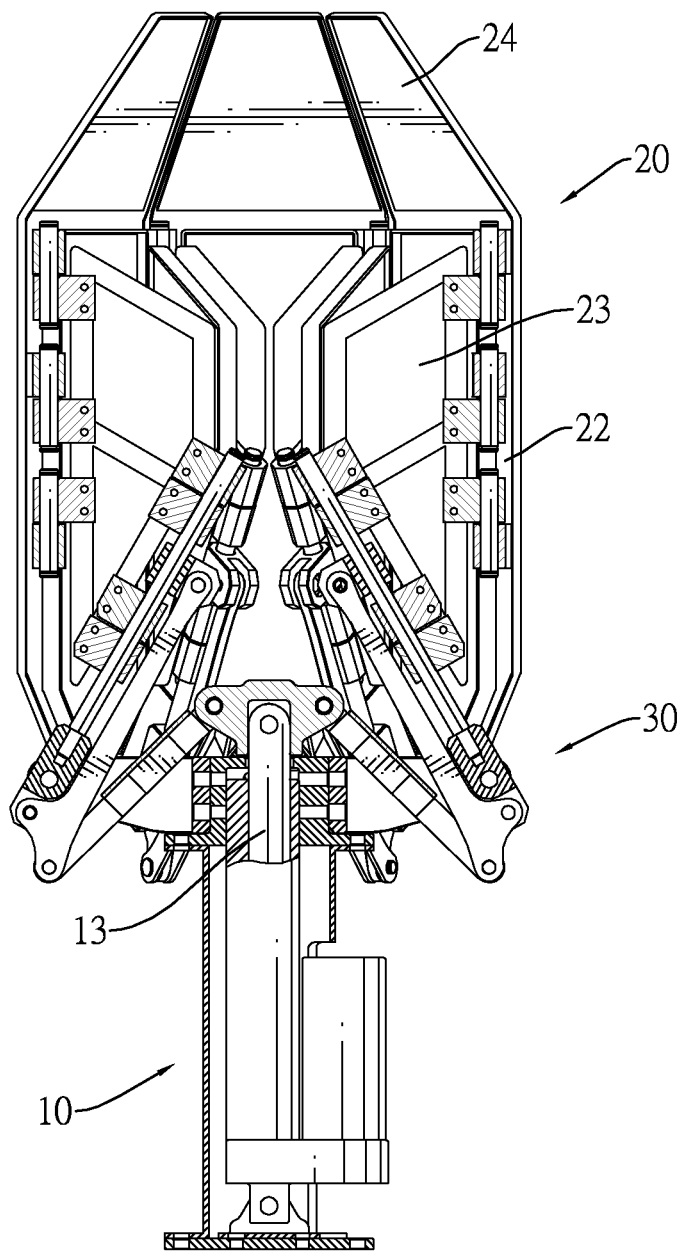
FIG. 6 is a side view in partial section of the solar energy collector in FIG. 1 when the solar energy collector is half-folded.
Figure 7:
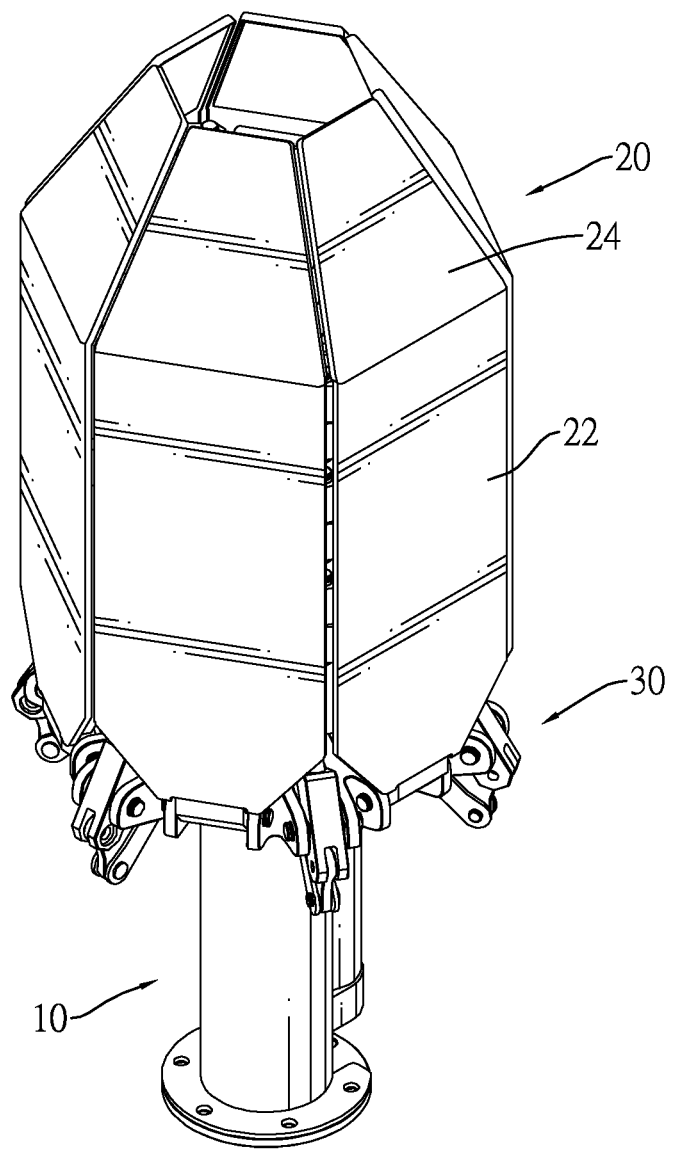
FIG. 7 is a perspective view of the solar energy collector in FIG. 1 when the solar energy collector is fully folded.

With further reference to FIG. 1, when the panel body 20 of the foldable solar energy collector is unfolded, the incidence surfaces of the side panels 22, the foldable panels 23, and the top panels 24 serve to receive sunlight. With reference to FIG. 5, when the panel body 20 is intended to be folded, the linear actuator 12 is activated to drive the telescopic shaft 13 to move downwardly and simultaneously lower the joints of the inside links 31 and the outside links 32. As each outside link 32 has the coupling block 34 sleeved around a corresponding guide rod 252A, the foldable panels 23 and the side panels 22 are pulled to move toward the center hole 211 and are thus folded. With reference to FIGS. 6 and 7, when the solar energy collector is folded, neighboring edges of each adjacent two of the top panels 24 abut against each other, the side panels 22 are erected, and each adjacent two of the foldable panels 23 approach each other and are surrounded by the side panels 22, so that the foldable solar energy generator resembles a hexagonal prism and the incidence surface of each of the side panels 22, the foldable panels 23, and the top panels 24 faces inwardly. When the panel body 20 is intended to be unfolded, the telescopic shaft 13 is driven to move upwardly to simultaneously drive the link assembly 30 so as to pull each of the side panels 22, the foldable panels 23, and the top panels 24 to unfold the solar energy collector.

When the panel body 20 of the solar energy collector is unfolded, the incidence surfaces of the side panels 22, the foldable panels 23, and the top panels 24 are fully exposed with a large area to receive sunlight. When the panel body 20 of the solar energy collector is folded, the compact size of the solar energy collector facilitates shipment, installation and storage of the solar energy collector. Moreover, during rainy or stormy weather, the panel body 20 can be folded so that the incidence surfaces of the side panels 22, the foldable panels 23, and the top panels 24 can be protected against damage, thereby prolonging the life duration and achieving better efficacy of the solar energy collector.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A foldable solar energy collector comprising:
   a base having a telescopic shaft being elevatable;
   a panel body having:
      a bottom board having:
         a perimeter;
         a center hole centrally formed through the bottom board; and
         multiple elongated channels radially formed through the bottom board and extending to the perimeter of the bottom board;

multiple side panels pivotally mounted around the perimeter of the bottom board, each side panel mounted between adjacent two of the elongated channels;

multiple foldable panels each having two edges, wherein one edge of each foldable panel is pivotally mounted on one edge of one of the side panels, and the other edge of the foldable panel is aligned with a direction of one of the elongated channels and pivotally mounted on one edge of adjacent one of the foldable panels; and multiple guide rods, wherein each guide rod is pivotally mounted between adjacent two of the foldable panels, and one end of the guide rod is pivotally mounted on the bottom board and located within one of the elongated channels so that the telescopic shaft penetrates through the center hole of the bottom board;

a link assembly having:

multiple link sets, each link set corresponding to one of the elongated channels of the bottom board and having:

an inside link having one end pivotally mounted around the telescopic shaft; and an outside link pivotally mounted on the inside link and having a pivoting portion, wherein the pivoting portion has:

a first end being adjacent to a corresponding inside link and pivotally connected to the end of a corresponding guide rod pivotally mounted on the bottom board;

a second end being farthest away from the corresponding inside link; and a third end located between the first end and the second end; and a coupling block pivotally connected to the second end of a corresponding outside link and slidably mounted around a corresponding guide rod;

wherein each of the side panels and the foldable panels is configured to transform solar energy to generate electricity when sun is incident on the same side of the solar collector as the inside links.

2. The foldable solar energy collector as claimed in claim 1, wherein each guide rod has a pivoting block formed on one end of the guide rod, pivotally mounted on the bottom board, and pivotally mounted to the third end of the pivoting portion of a corresponding one of the outside links.

3. The foldable solar energy collector as claimed in claim 2, wherein the pivoting block of each guide rod has:

an outer bore formed through the pivoting block, pivotally mounted to the bottom board and located within one of the elongated channels; and an inner bore formed through the pivoting block and pivotally connected to the third end of the pivoting portion of a corresponding outside link.

4. The foldable solar energy collector as claimed in claim 3, wherein each adjacent two of the foldable panels are pivotally mounted together with at least one second hinge; and each one of the at least one second hinge has:

two second hinge wings respectively and securely mounted on two edges of adjacent two of the foldable panels; and a guide rod mounted through the two second hinge wings.

5. The foldable solar energy collector as claimed in claim 4, wherein each foldable panel and a corresponding side panel are pivotally mounted together with at least one first hinge; and each one of the at least one first hinge has:

two first hinge wings, wherein one first hinge wing is securely mounted on one edge of the foldable panel, and the other first hinge wing is securely mounted on a corresponding edge of the side panel; and a pin mounted through the two first hinge wings.

6. The foldable solar energy collector as claimed in claim 5, wherein the link assembly further has a cap mounted around a top end of the telescopic shaft; and one end of the inside link of each link set away from the outside link is mounted on a periphery of the cap.

7. The foldable solar energy collector as claimed in claim 1, wherein the base further has a support stand, and the support stand is hollow and has a linear actuator mounted therein and the telescopic shaft protruding beyond a top of the support stand.

8. The foldable solar energy collector as claimed in claim 2, wherein the base further has a support stand, and the support stand is hollow and has a linear actuator mounted therein and the telescopic shaft protruding beyond a top of the support stand.

9. The foldable solar energy collector as claimed in claim 3, wherein the base further has a support stand, and the support stand is hollow and has a linear actuator mounted therein and the telescopic shaft protruding beyond a top of the support stand.

10. The foldable solar energy collector as claimed in claim 4, wherein the base further has a support stand, and the support stand is hollow and has a linear actuator mounted therein and the telescopic shaft protruding beyond a top of the support stand.

11. The foldable solar energy collector as claimed in claim 5, wherein the base further has a support stand, and the support stand is hollow and has a linear actuator mounted therein and the telescopic shaft protruding beyond a top of the support stand.

12. The foldable solar energy collector as claimed in claim 6, wherein the base further has a support stand, and the support stand is hollow and has a linear actuator mounted therein and the telescopic shaft protruding beyond a top of the support stand.

13. The foldable solar energy collector as claimed in claim 1, wherein the panel body further has multiple top panels, and each top panel is obliquely formed on and protrudes upwardly from one edge of one of the side panels away from the bottom board.

14. The foldable solar energy collector as claimed in claim 2, wherein the panel body further has multiple top panels, and each top panel is obliquely formed on and protrudes upwardly from one edge of one of the side panels away from the bottom board.

15. The foldable solar energy collector as claimed in claim 3, wherein the panel body further has multiple top panels, and each top panel is obliquely formed on and protrudes upwardly from one edge of one of the side panels away from the bottom board.

16. The foldable solar energy collector as claimed in claim 4, wherein the panel body further has multiple top panels, and each top panel is obliquely formed on and protrudes upwardly from one edge of one of the side panels away from the bottom board.

17. The foldable solar energy collector as claimed in claim 5, wherein the panel body further has multiple top panels, and each top panel is obliquely formed on and protrudes upwardly from one edge of one of the side panels away from the bottom board.

18. The foldable solar energy collector as claimed in claim 6, wherein the panel body further has multiple top panels, and each top panel is obliquely formed on and protrudes upwardly from one edge of one of the side panels away from the bottom board.

19. The foldable solar energy collector as claimed in claim 7, wherein the panel body further has multiple top panels, and each top panel is obliquely formed on and protrudes upwardly from one edge of one of the side panels away from the bottom board.

20. The foldable solar energy collector as claimed in claim 8, wherein the panel body further has multiple top panels, and each top panel is obliquely formed on and protrudes upwardly from one edge of one of the side panels away from the bottom board.

\* \* \* \* \*